United States Patent [19]

Chassot et al.

[11] Patent Number: 5,522,925
[45] Date of Patent: Jun. 4, 1996

[54] ORGANIC PIGMENTS COATED WITH ZR OR TI PHOSPHATE COMPLEXES

[75] Inventors: Laurent Chassot, Praroman; Philippe Bugnon, Essert, both of Switzerland

[73] Assignee: Ciba-Geigy Corporation, Tarrytown, N.Y.

[21] Appl. No.: 359,688

[22] Filed: Dec. 20, 1994

[30] Foreign Application Priority Data

Dec. 22, 1993 [CH] Switzerland .............................. 3819/93

[51] Int. Cl.$^6$ ...................................................... C08K 5/00
[52] U.S. Cl. .......................... 106/498; 106/493; 106/496; 106/497
[58] Field of Search ..................................... 106/437, 438, 106/447, 448, 450, 493, 496, 497, 498

[56] References Cited

U.S. PATENT DOCUMENTS

| | | | |
|---|---|---|---|
| 3,946,134 | 3/1976 | Sherman | 428/403 |
| 4,110,492 | 8/1978 | Hayman | 427/214 |
| 4,734,137 | 3/1988 | Kasahara et al. | 106/497 |
| 4,880,472 | 11/1989 | Bugnon et al. | 106/493 |
| 5,123,965 | 6/1992 | Herren et al. | 106/462 |
| 5,274,010 | 12/1993 | Bugnon et al. | 523/203 |
| 5,282,897 | 2/1994 | Bugnon | 106/437 |
| 5,401,780 | 3/1995 | Bugnon et al. | 523/206 |

FOREIGN PATENT DOCUMENTS

| | | |
|---|---|---|
| 0296111 | 12/1988 | European Pat. Off. . |
| 0528601 | 2/1993 | European Pat. Off. . |
| 1253937 | 1/1961 | France . |
| 2286179 | 4/1976 | France . |
| 2434173 | 2/1975 | Germany . |

OTHER PUBLICATIONS

Derwent Abstract 76–26448X/15 of FR 2286179, May 1976.

*Primary Examiner*—Mark L. Bell
*Assistant Examiner*—Scott L. Hertzog
*Attorney, Agent, or Firm*—Michele A. Kovaleski

[57] ABSTRACT

Pigment compositions comprising an organic pigment, the particle surface of which is provided with a protective coating, which coating consists of a metal phosphate complex in which the metal is selected from the group consisting of zirconium, titanium and mixtures thereof, and the amount of said coating is 0.5 to 100% by weight, preferably from 0.5 to 40% by weight, most preferably from 5 to 40% by weight, based on the pigment. They are distinguished by excellent properties, in particular by the high gloss of the colorations obtained with them, by superior dispersion stability, heat resistance and by very good rheology of the mill bases or printing inks prepared with them. Plastics pigmented with the novel compositions are also distinguished by superior heat resistance and plastic parts are substantially warp-free.

18 Claims, No Drawings

ORGANIC PIGMENTS COATED WITH ZR OR TI PHOSPHATE COMPLEXES

The present invention relates to organic pigments, the particle surface of which is provided with a tenacious coating of a phosphate complex of Zr or Ti, and to their preparation and the use thereof. They are distinguished by excellent properties, in particular by the high gloss of the colorations obtained with them, by superior dispersion stability and by very good rheology of the mill bases or printing inks prepared with them.

The coating of pigment particles with a phosphate complex of Al or Mg is disclosed in U.S. Pat. No. 3,946,134. It is claimed in this patent specification that inorganic and organic pigments provided with such a coating have improved resistance to chemicals and heat and enhanced lightfastness.

It has now been found that coating the pigment particles with Zr and/or Ti phosphate complexes improves the properties of the pigments in a surprisingly more marked manner, in particular with respect to gloss, dispersion stability, heat resistance and rheological behaviour.

Accordingly, the invention relates to pigment compositions comprising an organic pigment, the particle surface of which is provided with a protective coating, which coating consists of a metal phosphate complex in which the metal is selected from the group consisting of zirconium, titanium and mixtures thereof, and the amount of said coating is 0.5 to 100% by weight, preferably up to 40% by weight, most preferably from 5 to 40% by weight, based on the pigment. The most advantageous amount of coating will depend in particular on the specific surface of the pigment to be coated.

The molar ratio of zirconium and/or titanium to phosphorus is preferably from 0.25:0.75, preferably from 0.45:0.55.

Fluoride or $BF_4^-$ ions may also be incorporated in the protective coating, as is also disclosed in U.S. Pat. No. 3,946,134.

All customary organic pigments, including quinophthalones, indanthrones, flavanthrones, pyranthrones, dioxazines, perinones, thioindigo, metal complexes and, particularly, diketopyrrolopyrroles, quinacridones, perylenes, anthraquinones, phthalocyanines, azo pigments, isoindolines and isoindolinones, are suitable for the preparation of the novel pigment compositions. The quinacridones are preferred and the diketopyrrolopyrroles are particularly preferred.

The invention also relates to a process for applying a tenacious coating of a metal phosphate complex to the particle surface of an organic pigment in which the metal is zirconium and/or titanium, which process comprises
a) dispersing the pigment with a Zr and/or Ti salt or chelate complex in water or a lower alkyl alcohol, or a mixture thereof, by conventional methods, and
b) adding the aqueous solution of the compound supplying the phosphate ions, with stirring,
   in such amounts that 0.5 to 100% by weight of metal phosphate complex is formed, based on the pigment, at a preferred molar ratio of metal to phosphorus of 0.25:0.75, or
   dispersing the pigment first with the compound supplying the phosphate ions and then adding the aqueous solution of the metal complex or metal chelate complex,
   such that the Zr and/or Ti phosphate complex forms in situ on the particle surface of the pigment and precipitates as protective layer.

It is preferred to disperse the pigment first with the metal salt or metal chelate complex and then to add the solution of the compound that supplies the phosphate ions.

Suitable Zr and/or Ti salts or complexes are typically zirconium sulfate, zirconium ammonium carbonate, zirconium acetate, zirconium propionate, zirconyl chloride, titanium (IV) chloride or titanyl sulfate and, preferably, the chelates of formulae

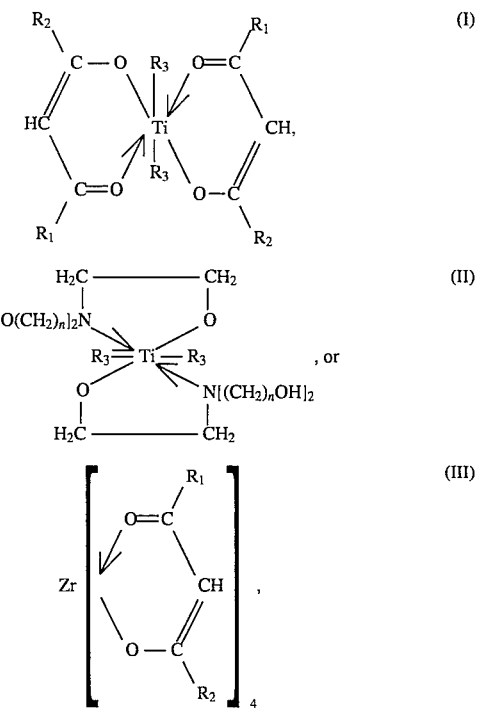

wherein n is an integer from 1 to 3, $R_1$ is methyl, ethyl, methoxy or ethoxy, $R_2$ is methyl or ethyl and $R_3$ is halogen or $C_1$–$C_4$alkoxy, and mixtures thereof.

Halogen substituents will conveniently be bromo, iodo and, preferably, chloro. $C_1$–$C_4$alkoxy is typically methoxy, ethoxy, n-propoxy, isopropoxy, n-butoxy, sec-butoxy or tert-butoxy.

It is preferred to use one of the chelates of formula I, II or III, wherein:

$R_1$ is preferably methyl or ethoxy, $R_2$ is preferably methyl, n is preferably 2, and $R_3$ is preferably $C_1$–$C_4$alkoxy, most preferably isopropoxy.

Particularly preferred chelates are zirconium and titanium acetylacetonate and titanium(IV) triethanolaminate.

Suitable lower alkyl alcohols typically include methyl, ethyl, n-propyl, isopropyl, n-butyl, sec-butyl, tert-butyl, or amyl alcohol. Dispersion is, however, preferably carried out in water, without an alcohol.

The phosphate ions are preferably added in the form of ortho-, meta- or pyrophosphoric acid or a salt, in particular an alkali metal salt, thereof.

Particularly suitable phosphate ion donors are typically orthophosphoric acid, orthophosphates such as $MH_2PO_4$, $M_2HPO_4$ or $M_3PO_4$, metaphosphoric acid, Knorre salt $[(NaPO_3)_3 \cdot 6H_2O]$, Graham's salt $[(NaPO_3)_6]$, calgon $[(NaPO_3)_{12-13} \cdot Na_2O]$, $M_2H_2P_2O_7$ and $M_4P_2O_7$, wherein M is Na, K or $NH_4$. Orthophosphates are preferred, in particular $Na_2HPO_4$ and $Na_3PO_4$.

The mixture is conveniently stirred for 15 minutes to 2 hours in the temperature range from 20° to 80° C., preferably at room temperature.

Fluoride or fluoroborate ions are preferably added in the form of an aqueous solution or suspension. It has been found that ammonium bifluoride ($NH_4HF_2$), hydrofluoric acid and sodium fluoride are particularly suitable for this purpose. The fluoride ions can be added to the suspension together or after the addition of the metal complex former. $BF_4^-$ ions, if used instead of fluoride ions, are preferably added in the form of the ammonium salt.

The pigments of this invention may additionally be provided with a further protective layer. This additional layer can be a metal oxide protective coating e.g. of silica and/or alumina, as disclosed in U.S. Pat. No. 4,880,472, or a layer of the alkyl esters of silicic acid usually referred to as silanes, e.g. the ®DYNASYLAN products sold by Dynamit Nobel, or a layer of acrylic resins. Preferred coatings are those with the aminoalkylacrylate resins described in U.S. Pat. No. 4,734,137.

The invention accordingly also relates to the pigment compositions as described above which are additionally coated with an aminoalkylacrylate resin layer obtainable by homopolymerisation of a monomer of formula

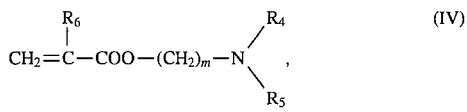

(IV)

wherein $R_6$ is hydrogen or methyl, and $R_4$ and $R_5$ are each independently of the other hydrogen, methyl or ethyl, and m is an integer from 1 to 6, or by copolymerisation of the same monomer with a monomer which is copolymerisable with said same monomer.

This additional coating can be applied by conventional methods, typically by slurrying the novel pigment composition in water and adding the desired coating agent in the desired customary amount, with stirring, as described in the aforementioned patent specifications.

The novel pigment compositions are very suitable for pigmenting organic material of high molecular weight, especially in the form of paint systems and printing inks. Organic materials of high molecular weight which can be coloured or pigmented with the compositions of this invention are cellulose ethers and esters, typically including ethyl cellulose, nitrocellulose, cellulose acetate or cellulose butyrate, natural resins or synthetic resins, typically polymerisation or condensation resins such as aminoplasts, preferably urea/formaldehyde and melamine/formaldehyde resins, alkyd resins, phenolic plastics, polycarbonates, polyurethanes, polyesters, silicone and silicone resins, singly or in mixtures.

Organic materials of high molecular weight in dissolved form as film formers, typically boiled linseed oil, nitrocellulose, alkyd resins, phenolic resins, melamine resins, acrylic resins and urea/formaldehyde resins, are also suitable.

Depending on the end use requirement, it is expedient to use the novel pigment compositions as toners or in the form of preparations. The pigment compositions can be used in an amount of 0.01 to 30% by weight, preferably 0.1 to 10% by weight, based on the organic material of high molecular weight to be pigmented.

The pigmenting of the high molecular weight organic materials with the novel compositions is conveniently effected by incorporating such a composition by itself or in the form of a masterbatch in the substrates using roll mills, mixing or milling apparatus. The pigmented material is then brought into the desired final form by methods which are known per se, conveniently by calendering, moulding, extruding, coating, casting or by injection moulding. It is often desirable to incorporate plasticisers into the high molecular weight compounds before processing in order to produce non-brittle mouldings or to diminish their brittleness. Suitable plasticisers are typically esters of phosphoric acid, phthalic acid or sebacic acid. The plasticisers may be incorporated before or after blending the compositions of this invention into the polymers. To obtain different shades it is also possible to add fillers or other chromophoric components such as white, coloured or black pigments in any amount to the high molecular weight organic materials in addition to the novel compositions.

For pigmenting paint systems, coating materials and printing inks, the high molecular weight organic materials and the novel compositions, together with optional additives such as fillers, other pigments, siccatives or plasticisers, are finely dispersed or dissolved in a common organic solvent or mixture of solvents. The procedure may be such that the individual components by themselves, or also several components together, are dispersed or dissolved in the solvent and thereafter all the components are mixed.

The colorations obtained are distinguished by good all-round fastness properties such as superior transparency, and good fastness to overspraying, migration, heat, light and weather.

Most particularly, the pigment compositions of this invention are distinguished by excellent rheological properties and superior dispersion stability in paint and printing ink systems, and the finishes obtained also exhibit superior gloss and excellent DOI (=distinctness of image). In industrial paints, the novel products have excellent heat resistance.

Owing to the good rheological properties of the novel pigment compositions, it is possible to prepare paints with high loadings of pigment.

When incorporated in plastics, the novel products are likewise distinguished by superior heat resistance and the plastic parts pigmented therewith are substantially warp-free.

The novel pigment compositions are especially suitable for colouring aqueous and/or solvent-borne paint systems, especially automotive lacquers. The most preferred utility is for metal effect finishes.

The invention is illustrated by the following Examples in which, unless otherwise stated, percentages are by weight.

EXAMPLE 1

63.5 g of a 31.5% aqueous filter cake of the diketopyrrolopyrrole of formula

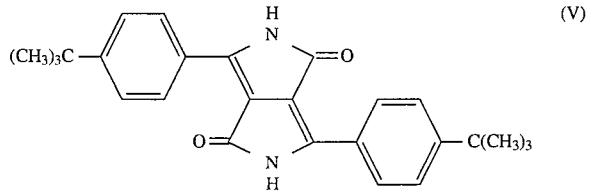

(prepared e.g. according to U.S. Pat. No. 4,579,949) are dispersed with 4.8 g of zirconium(IV) acetylacetonate in 132 ml of water. With stirring, a solution of 7.05 g of $Na_2HPO_4.12\ H_2O$ in 70 ml of water is pumped to this suspension over 2½ hours. The suspension is subsequently filtered and the residue is washed with water, dried at 80° C., and pulverised.

EXAMPLE 2

Example 1 is repeated, with the sole exception that the diketopyrrolopyrrole of formula V is replaced with the same amount of the diketopyrrolopyrrole of formula

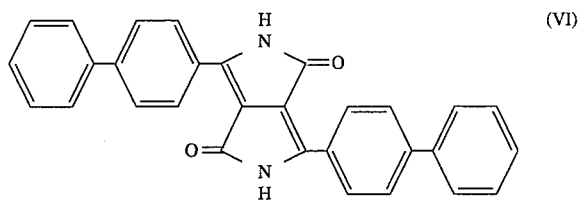

(prepared e.g. according to U.S. Pat. No. 4,579,949).

EXAMPLE 3

27.2 g of a 36.8% filter cake of the diketopyrrolopyrrole of formula VI (cf. Example 2) are dispersed with 2.57 g of titanium(IV) triethanolaminate of formula

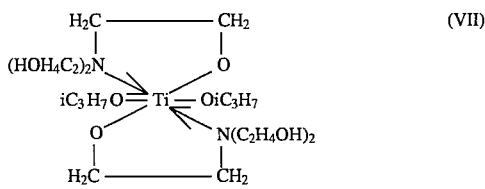

(Dynamit Nobel, 80% solution in isopropanol) in 70 ml of water. With stirring, a solution of 3 g of $Na_2HPO_4.12\ H_2O$ in 40 ml of water is added slowly to this suspension over c. 1 hour. The suspension is then filtered and the residue is washed with water, dried at 80° C. and pulverised.

EXAMPLE 4

Example 3 is repeated, but replacing titanium triethanolaminate with 1.26 g of $Zr(SO_4)_2.4H_2O$ and using only 2.53 g, instead of 3 g, of $Na_2HPO_4.12\ H_2O$.

EXAMPLE 5

2 g of the product obtained according to Example 1 and 48 g of a stoving lacquer comprising

| | |
|---|---|
| 56 g | of alkyd resin ALKYDAL ® F310 (Bayer AG; 60% in xylene) |
| 13 g | of melamine resin CYMEL ® 327 (Cyanamid; 90% in butanol) |
| 25 g | of xylene |
| 25 g | of butanol |
| 2.5 g | of 1-methoxy-2-propanol and |
| 1 g | of silicone oil (1% in xylene) | are mixed by conventional methods. The resultant colour lake is drawn to a film on a glass plate. Before stoving in a circulating air oven (30 minutes at 120° C.), the coating is allowed to dry in the air for c. 30 minutes at an inclination of 25°.

The gloss values are measured with a gloss meter (Zehntner ZGM 1020®) at an inclination of 20° according to DIN 67 530.

The finish so obtained has a gloss which is very surprisingly better than that of a finish obtained with an uncoated pigment.

Replacement of the product of Example 1 with each of the products of Examples 2–4 gives comparable results, with a very surprising improvement in gloss over finishes obtained with uncoated pigments.

EXAMPLE 6

128.5 g of a 15.56% filter cake of 2,9-dimethylquinacridone of formula

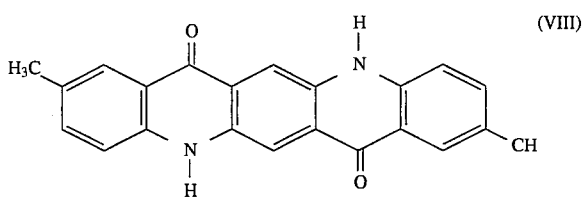

and 4.8 g of zirconium(IV) acetylacetonate are dispersed in 366.7 g of water. With stirring, a solution of 7.08 g of $Na_2HPO_4.12\ H_2O$ in 50 ml of water is added over 50 minutes. The suspension is adjusted to pH=5 with dilute acetic acid, stirred for a further 1 hour and then filtered. The residue is washed with water, dried at 80° C. and pulverised.

EXAMPLE 7

27.2 g of a 36.8% moist filter cake of the diketopyrrolopyrrole pigment C.I. Pigment Red 255 and 1.02 g of zirconium(IV) acetylacetonate are dispersed in 72 g of water for 4 hours. With stirring, a solution of 1.3 g of $NaH_2PO_4.2\ H_2O$ in 20 ml of water is added over 40 minutes. The suspension is stirred for a further 1 hour and then filtered. The residue is washed with water, dried and pulverised.

EXAMPLE 8

27.06 g of a 36.96% filter cake of isoindolinone C.I. Pigment Yellow 110 and 2.24 g of zirconium(IV) acetylacetonate are dispersed in 71 g of water over 4 hours. With stirring, a solution of 3.3 g of $Na_2HPO_4.12\ H_2O$ in 40 ml of water is added over 40 minutes. The suspension is adjusted to pH=5 with dilute acetic acid, stirred for a further 1 hour and then filtered. The residue is washed with water, dried and pulverised.

EXAMPLE 9

The procedure of Example 1 is repeated, but starting from 1,4-diketo-3,6-diphenylpyrrolo[3,4-c]pyrrole of formula

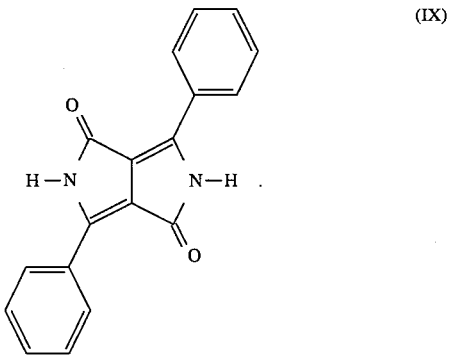

EXAMPLES 10–13

The procedure of Example 9 is repeated, but starting from the following metal salts or metal chelate complexes:

| Example | metal salt or metal chelate complex |
|---|---|
| 10 | titanium(IV) triethanolaminate |
| 11 | $Zr(SO_4)_2$ |

| Example | metal salt or metal chelate complex |
|---------|--------------------------------------|
| 12 | Ti(O)SO$_4$ |
| 13 | zirconium(IV) acetate |

EXAMPLES 14–21

The procedure of Example 5 is repeated, but starting from the products of Examples 6–13 instead of the product of Example 1. The gloss of the finishes so obtained are very surprisingly better than that of finishes obtained with uncoated pigments.

Ca4B filter cake: 74.8 g 2-amino-5-methylbenzenesulphonic acid are dispersed in 580 ml of water. Then 34.9 g 47% aqueous sodium hydroxide solution are added and the mixture is heated with stirring at 40° C. until a complete solution is obtained. The solution is cooled to 0° C. by the addition of ice. A solution of 27.6 g of sodium nitrite in 50 ml of water is added, followed by 90.0 g of 36% aqueous hydrochloric acid. The diazotised slurry is stirred for 28 minutes while the temperature is maintained at 0° C.

75.2 g of 2-hydroxy-3-naphthoic acid are dissolved at 40° C. in 1300 ml of water and 42.6 of 47% aqueous sodium hydroxide. The coupler solution is cooled to 5° C. by the addition of ice.

The diazotised slurry is then added to the coupler solution over 30 minutes with stirring. The pH is initially allowed to fall to pH 10.6–10.8, where it is then maintained by addition of dilute sodium hydroxide solution. 126.8 g of solid calcium chloride are added to the suspension obtained and stirring is continued for 75 minutes, while maintaining a temperature of 5°–8° C. The suspension is heated to 70° C. over 15 minutes and then filtered. The Ca4B filter cake obtained in washed with water until salt-free.

EXAMPLE 22

119.8 g of 20.9% moist Ca4B filter cake are dispersed in 258.2 g of water at high speed for 2 hours. 6.88 g of zirconium(IV) acetylacetonate are then added and the mixture is high speed stirred for 7 hours. A solution of 10.1 g of Na$_2$HPO$_4$.12 H$_2$O in 19 ml of water is added over 2¼ hours at room temperature. The suspension is filtered; the residue is washed with water and dried overnight at 70° C., then roasted at 90° C. for 4 hours.

EXAMPLE 23

6.21 g of the product obtained according to Example 22 and 50.0 g of an unpigmented toluene-phenolic resin gravure ink (containing 2.05 g of resin) are dispersed during 16 hours using a ballmill. The resultant ink is gravure printed in the usual way.

The quality of the ink dispersion as well as the transparency and the gloss of prints so obtained are surprisingly better than the corresponding properties obtained with an uncoated pigment.

What is claimed is:

1. A pigment composition comprising an organic pigment, the particle surface of which is provided with a protective coating, which coating consists of a metal phosphate complex in which the metal is selected from the group consisting of zirconium, titanium and mixtures thereof, and the amount of said coating is 0.5 to 100% by weight, based on the pigment.

2. A pigment composition according to claim 1, wherein the pigment is a pigment of the diketopyrrolopyrrole, quinacridone, perylene, anthraquinone, phthalocyanine, azo, isoindoline or isoindolinone series.

3. A pigment composition according to claim 1, wherein the pigment is a pigment of the diketopyrrolopyrrole or quinacridone series.

4. A pigment composition according to claim 1, which is additionally provided with a coating of an aminoalkylacrylate resin obtainable by homopolymerisation of a monomer of formula

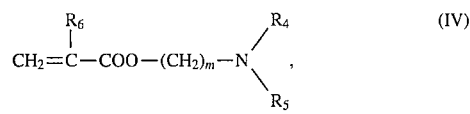

wherein R$_6$ is hydrogen or methyl, and R$_4$ and R$_5$ are each independently of the other hydrogen, methyl or ethyl, and m is an integer from 1 to 6, or by copolymerisation of the same monomer with a monomer which is copolymerisable with said same monomer.

5. A process for applying an adhesive coating of a metal phosphate complex to the particle surface of an organic pigment in which the metal is zirconium and/or titanium, which comprises a) dispersing the pigment with a Zr and/or Ti salt or chelate complex in water or a lower alkyl alcohol, or a mixture thereof, and b) adding an aqueous solution of a compound supplying phosphate ions, with stirring, in such amounts that 0.5 to 100% by weight of metal phosphate complex is formed, based on the pigment, or dispersing the pigment first with a compound supplying phosphate ions and then adding an aqueous solution of the Zr and/or Ti salt or chelate complex, such that the Zr and/or Ti phosphate complex forms in situ on the particle surface of the pigment and precipitates as protective layer.

6. A process according to claim 5, wherein 5 to 40% by weight of metal phosphate complex is obtained, based on the pigment.

7. A process according to claim 5, which comprises first dispersing the pigment with the Zr and/or Ti salt or chelate complex and then adding the solution of the compound that supplies the phosphate ions.

8. A process according to claim 5, which comprises using a Zr or Ti salt or a complex selected from the group consisting of zirconium sulfate, zirconium ammonium carbonate, zirconium acetate, zirconium propionate, zirconyl chloride, titanium (IV) chloride or titanyl sulfate and of chelates of formulae

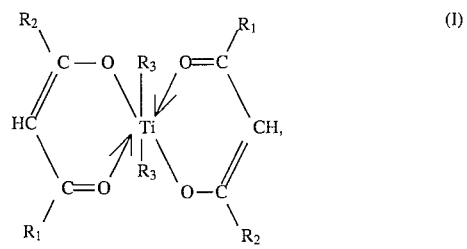

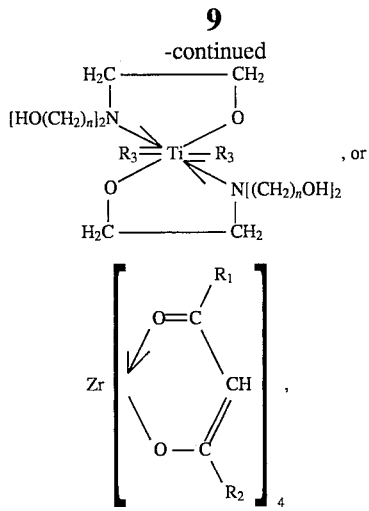

wherein n is an integer from 1 to 3, $R_1$ is methyl, ethyl, methoxy or ethoxy, $R_2$ is methyl or ethyl and $R_3$ is halogen or $C_1$–$C_4$alkoxy, or a mixture thereof.

9. A process according to claim 8, which comprises the use of a chelate of formula I, II or III, wherein $R_1$ is methyl or ethoxy, $R_2$ is methyl, n is 2, and $R_3$ is $C_1$–$C_4$alkoxy.

10. A process according to claim 5, wherein the compound that supplies phosphate ions is a compound selected from the group consisting of orthophosphoric acid, $MH_2PO_4$, $M_2HPO_4$ or $M_3PO_4$, metaphosphoric acid, Knorre salt [$(NaPO_3)_3 \cdot 6 H_2O$], Graham's salt [$(NaPO_3)_6$], calgon [$(NaPO_3)_{12-13} \cdot Na_2O$], $M_2H_2P_2O_7$ and $M_4P_2O_7$, wherein M is Na, K or $NH_4$.

11. A process according to claim 10, wherein an orthophosphate is used.

12. A process according to claim 5, wherein dispersion is carried out in water.

13. A process according to claim 5, wherein fluoride or fluoroborate ions are additionally incorporated.

14. An organic material of high molecular weight containing a pigment composition as claimed in claim 1.

15. An organic material of high molecular weight according to claim 14, which is a paint system or a printing ink.

16. An organic material of high molecular weight according to claim 15, which is an automotive lacquer.

17. A pigment composition according to claim 1, wherein the amount of said protective coating is from 5 to 40% by weight, based on the pigment.

18. A process according to claim 5, wherein the molar ratio of metal to phosphorus in step (b) is 0.25:0.75.

* * * * *